US008146846B2

(12) United States Patent
Denis

(10) Patent No.: US 8,146,846 B2
(45) Date of Patent: Apr. 3, 2012

(54) WEAR LINER FOR A BRUSH CUTTER

(76) Inventor: Laurent Denis, Roxton Falls (CA)

( * ) Notice: Subject to any disclaimer, the term of this patent is extended or adjusted under 35 U.S.C. 154(b) by 202 days.

(21) Appl. No.: 12/583,377

(22) Filed: Aug. 20, 2009

(65) Prior Publication Data

US 2011/0042499 A1 Feb. 24, 2011

(51) Int. Cl.
*A01D 34/00* (2006.01)
*B02B 5/02* (2006.01)
*B02B 7/00* (2006.01)
*B02C 9/04* (2006.01)

(52) U.S. Cl. .................. 241/101.77; 241/183; 241/277; 241/300

(58) Field of Classification Search ............. 241/101.77, 241/277, 300, 182, 183
See application file for complete search history.

(56) References Cited

U.S. PATENT DOCUMENTS 1,211,784 A 1/1917 Stuart
3,110,521 A 11/1963 Rogers et al.
3,944,147 A * 3/1976 Pletcher .......................... 241/60
4,054,194 A 10/1977 Davis
4,529,660 A 7/1985 Heim
4,595,318 A 6/1986 Viesselmann
4,848,681 A * 7/1989 Eriksson et al. .............. 241/183
5,029,761 A 7/1991 Bechler
5,184,706 A 2/1993 Christenson
5,190,140 A * 3/1993 Buschbom .................... 198/642
5,209,278 A * 5/1993 Carpenter et al. ............ 144/230
5,244,069 A 9/1993 Cosgrove
7,451,944 B2 * 11/2008 Hall et al. ..................... 241/207

* cited by examiner

*Primary Examiner* — Bena Miller
(74) *Attorney, Agent, or Firm* — Norton Rose Canada LLP

(57) ABSTRACT

A wear liner for use with a brush cutter, the cutter having a cylindrical, rotatable, cutting drum carrying cutting teeth and a cover at least partially covering the drum to limit dispersal of cut material. The liner comprises a sheet of material which can be shaped to fit against the inner surface of the cover. The liner has holes on its sides for use in detachably connecting the liner with fastening means to the cover against the cover's inner surface. The liner has protective means mounted on its inner surface adjacent each hole to protect part of the fastening means located adjacent the inner surface of the liner, when the liner is mounted to the cover and the fastening means extend through the opening, from wear by material thrown by the cutter during its operation.
The invention is also directed toward a brush cutter incorporating the liner.

14 Claims, 2 Drawing Sheets

WEAR LINER FOR A BRUSH CUTTER

BACKGROUND OF THE INVENTION

1. Technical Field

This invention is directed toward a wear liner for a brush cutter and to a brush cutter incorporating the wear liner.

2. Background Art

Brush cutters employ a cylindrical drum with cutting teeth mounted on the drum. Rotation of the drum while it is being pushed against brush causes the teeth to cut up the brush. The drum is partly covered with a part cylindrical hood or cover to support the drum and the means rotating the drum and to limit the dispersal of the wood pieces and chips produced by the brush cutter when operated. The unit is carried on the end of a boom on a vehicle or at the front of a vehicle.

Brush cutters are often employed in sandy conditions and the teeth on the cutters used in this environment throw a lot of sand against the cover quickly causing it to wear out. It is expensive to replace the cover.

SUMMARY OF THE INVENTION

It is the purpose of the present invention to provide a wear liner that can be easily mounted against the inner surface of the cover and quickly and inexpensively replaced when worn so as to extend the life of the cover. It is another purpose of the present invention to provide a wear liner having protective means protecting the fastening means mounting the wear liner to the cover from excessive wear.

The liner is shaped to fit within the cover against its inner surface and is detachably held in place with fastening means. The fastening means preferably comprises nuts and bolts. The liner is proved with a set of mounting holes that match with a set of mounting holes on the cover when the liner is positioned in place against the inner surface of the cover. The bolts pass through both sets of mounting holes when they are aligned to mount the liner against the inner surface of the cover.

Each hole on the inner surface of the liner is provided with raised protective means to protect the fastening means holding the liner to the cover from abrasion and wear from the sand thrown against the cover during its operation in sandy soil. The protective means can comprise a ring of hardened material welded about each hole of the liner on its inner surface. The ring is just large enough to receive within it one end of the fastening means. When fastening means comprise a nut and bolt, the opening in the ring is just large enough to receive within its confines the head of the bolt or the nut, with enough clearance to allow tightening of the connection.

The invention is broadly directed toward a wear liner for use with a brush cutter at least partly enclosed with a cover. The liner comprises a sheet of material which can be shaped to fit against the inner surface of the cover on the cutter. The liner has a set of holes through which fastening means can be employed to detachably connect the liner to the cover against the cover's inner surface.

The liner has protective means adjacent each hole to protect the fastening means, extending through the hole to the inner surface of the liner when the liner is mounted to the cover, from being struck by all the material thrown by the cutter during its operation.

The invention is also directed toward a brush cutter equipped with the liner.

DETAILED DESCRIPTION OF THE INVENTION

Figure 1:
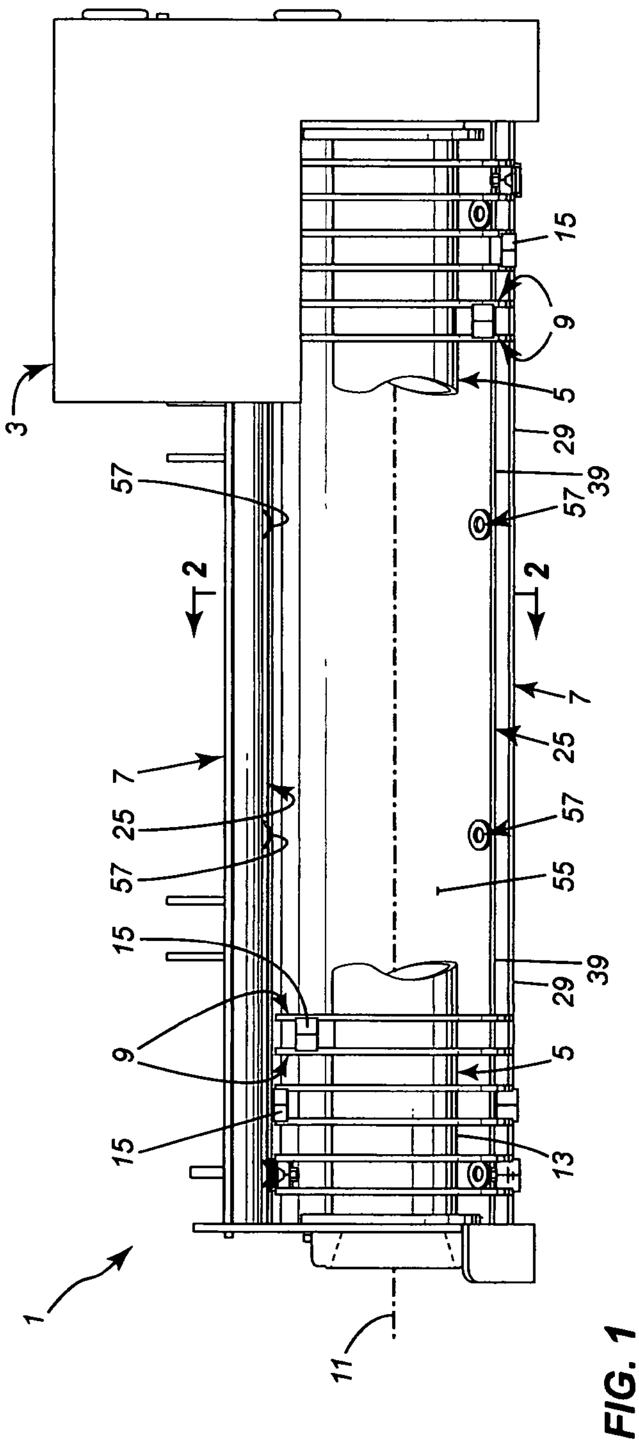
FIG. 1 is a front view of a brush cutter with the liner installed.
Figure 2:
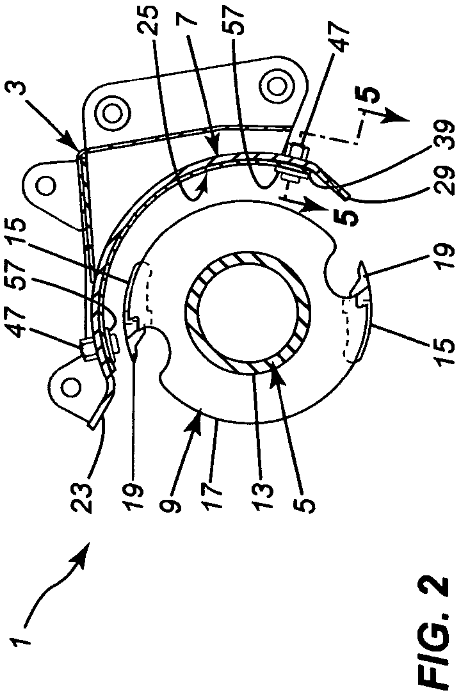
FIG. 2 is a cross-section view along line 2-2 in FIG. 1.
Figure 3:
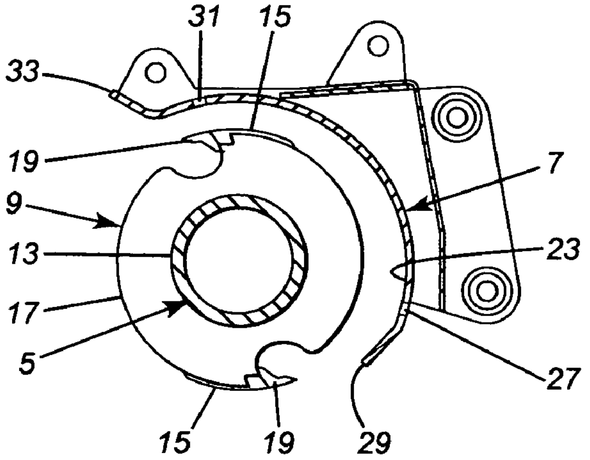
FIG. 3 is a cross-section view similar to FIG. 2 but with the liner removed.

The brush cutter 1, as shown in FIGS. 1 to 3, has a cutting head 3 which comprises a cylindrical cutting drum 5 mounted within a cover 7. A plurality of annular mounting rings 9 are mounted along the length of the drum 5, the rings 9 extending transversely to the longitudinal axis 11 of the drum 5. The rings 9 are welded onto the surface 13 of the drum 5. At least one support block 15 is mounted between every pair of adjacent rings 9, the blocks 15 being welded to the rings at their outer periphery 17. A cutting tooth 19 is detachably mounted on the front of each support block 15. Rotation of the drum 5 about its longitudinal axis 11 within the cover 7 will cause the teeth 9 to cut brush when the cutting head 3 is moved against the brush. The cover 7 prevents the cut brush pieces and chips, produced from cutting the brush, from being widely dispersed.

Figure 4:
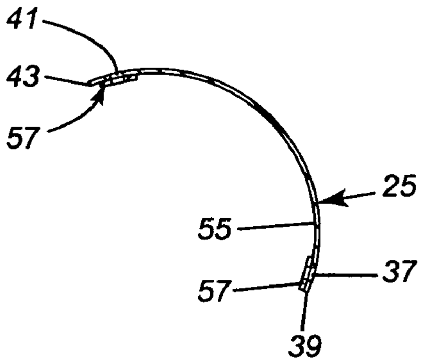
FIG. 4 is a cross-section view of the liner.

When working in sandy ground, the teeth 9 will often throw sand up against the inner surface 23 of the cover 7 causing it to wear quickly. To minimize the wear on the cover, it is provided with a detachable wear liner 25, shown in FIG. 4, that takes the wear and is readily and inexpensively replaceable thus saving the cover 7 from extensive wear. To mount the liner 25 on the cover 7, the cover is provided with a first set of holes 27 at one side 29 of the cover across its width and a second set of holes 31 at the other side 33 of the cover across its width. The holes 27, 31 extend through the cover 7.

The liner 25 is made from suitable wear resistant material such as a metal, a composite plastic or a composite plastic-metal material. The liner 25 is preferably made from a high carbon steel such as SSAB Hardox® 500 (with a Brinnel hardness between 470-530). The liner 25 is sized to substantially cover the inner surface 23 of the cover 7. The liner 25 can be pre-shaped to fit snugly against the inner surface 23 of the cover 7 or it can be flexible and bent to abut the inner surface 23 during installation. The liner 25 has a first set of holes 37 drilled at one side 39 of the liner across its width and a second set of holes 41 at the other side 43 of the liner across its width. The holes 37, 41 extend through the liner and the first set of holes 37 will match up with the first set of holes 27 on the cover 7 when the liner is mounted on the cover against its inner surface 23 while the second set of holes 41 will match up with the second set of holes 31 on the cover. If the liner is flexible it is attached to the cover all along one side 27 of the cover first and then bent against the cover to attach it to the other side 25.

Figure 5:
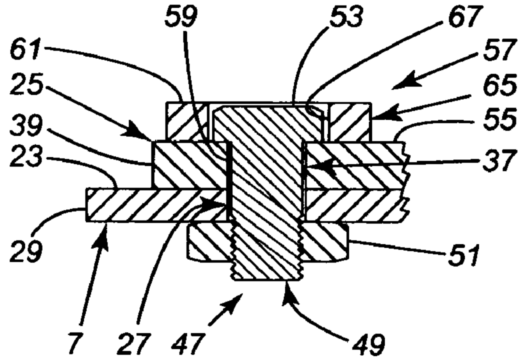
FIG. 5 is a cross-section view taken along line 5-5 in FIG. 4.

The liner 25 is attached to the cover 7 with fastening means 47 as shown in FIG. 5. The fastening means 47 can comprise bolts 49 which extend through the aligned sets of holes 27, 37 and 31, 41 on both sides of the liner and cover. A nut 51 is fastened to each installed bolt 49. The head 53 of each bolt 49 is preferably on the inner surface 55 of the liner.

Figure 6:
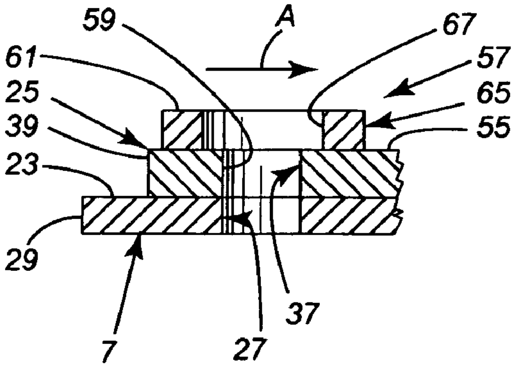
FIG. 6 is a cross-section view similar to FIG. 5 but with the bolt and nut removed

Protective means 57 are provided adjacent each hole 37, 41 on the inner surface 55 of the liner 25, the protective means 57 at least on the side 59 of the holes 37, 41 first passed by the teeth 9 during their rotation during operation of the cutter. FIG. 6 shows an arrow 'A' showing the direction of rotation of the cutting teeth and shows that at least a portion 61 of the protective means 57 is located on the side 59 of the holes 37, 41 first passed by the teeth during their rotation. The protective means 57 protect the fastening means 47 passing through the holes 37, 41 and extending inwardly past the inner surface 55 of the liner as shown in FIG. 5. The protective means 57 are made from hardened material such as SSAB Hardox® 500 steel and are welded to the inner surface 55 of the liner.

The protective means 57 preferably comprise a ring 65 located to surround each hole 37, 41. The inner circular periphery 67 of the ring 65 is large enough to receive the head 53 of the bolt 49 with enough clearance for insertion of a tightening tool between the bolt head 53 and the ring 65. The rings 65 are thick enough to protect the bolt heads 53 but not so thick as to interfere with the cutting teeth 19 on the drum 5 as the drum rotates. The ring 65 is also wide enough between its inner and outer radii so that it will not wear out before the liner wears out.

While the fastening means 47 have been described with the head 53 of the bolt 49 adjacent the inner surface 55 of the liner 25, the bolt 49 could be reversed to have the head 53 adjacent the outer surface of the cover 7 with the nut 51 within the ring 65 adjacent the inner surface 55 of the liner 25.

The protective means 57 has been described as a ring. However it could also be in the form of a half ring or a v-shaped bar mounted on the inner surface adjacent the side of the opening that the teeth first pass during rotation, the convex side of the half ring or the apex of the v-shaped bar facing the approaching teeth. The protective means could have other shapes as well.

The liner, when installed within the cover, protects the cover from wear due to sand and any other materials being thrown against the cover by the rotating teeth of the cutting head. When the liner becomes worn, it is easily replaced. The protective means on the inner surface of the liner also protect the fastening means from being abraded and worn away by the sand before the liner has lost its usefulness. Since the fastening means project inwardly from the liner they would be subject to more wear than the liner itself and thus they need protection as well as the cover.

The novel liner is for use with brush cutters. While one specific form of brush cutter has been described, the liner will work with other brush cutters such as brush cutters having the cutting tooth supports mounted directly on the surface of the drum with the cutting teeth mounted on the front of the supports.

I claim:

1. A wear liner for protecting a cover at least partially covering a cutting drum of a brush cutter, the liner comprising a sheet of wear resistant material which can be shaped to fit against the inner surface of the cover, the liner having holes defined therethrough sized to receive removable fasteners attaching the liner to the cover, at least part of the fasteners being located adjacent an inner surface of the liner when the liner is mounted to the cover and the fasteners extend through the holes, the liner including a protective element mounted on its inner surface adjacent each hole to protect the part of a corresponding one of the fasteners located adjacent the inner surface of the liner from wear by material thrown by the cutter during its operation.

2. A wear liner as claimed in claim 1 wherein each protective element is located at least on the side of the hole first passed by teeth on the cutting drum during the rotation of the drum when the liner is mounted on the cover, the protective element being at least as thick as that part of the corresponding one of the fasteners on the inner surface of the liner.

3. A wear liner as claimed in claim 2 wherein the liner and the protective means are made from high carbon steel.

4. A wear liner as claimed in claim 1 wherein each protective element comprises a protective ring surrounding each hole and welded to the inner surface of the liner, the ring being at least as thick as that part of the corresponding one of the fasteners on the inner surface of the liner.

5. A wear liner as claimed in claim 4 wherein the liner and the rings are made from high carbon steel.

6. A wear liner as claimed in claim 1 wherein the liner and protective elements are made from high carbon steel.

7. A wear liner as claimed in claim 1 wherein the liner and the protective elements are made from steel having a Brinnel hardness between 470 and 530.

8. A brush cutter comprising: a rotatable cylindrical cutting drum including a plurality of detachable cutting teeth; a cover partly covering the drum and having a first set of holes defined therein; a wear liner formed by a sheet of material shaped to fit against an inner surface of the cover to face the cutting drum, the liner protecting the cover from wear by material thrown by the cutter during its operation, the liner having a second set of holes defined therethrough in correspondence with the first set of holes; a plurality of fasteners detachably connecting the liner to the inner surface of the cover, each fastener passing through corresponding ones of the first and second holes, at least part of each fastener being located adjacent an inner surface of the liner when the liner is mounted to the cover; the liner having a protective element mounted on its inner surface adjacent each second hole to protect the part of a corresponding one of the fasteners located adjacent the inner surface of the liner from wear by material thrown by the cutter during its operation.

9. A brush cutter as claimed in claim 8 wherein each protective element on the wear liner is located at least on the side of the second hole first passed by the teeth on the cutting drum during the rotation of the drum, each protective element being at least as thick as that part of the corresponding one of the fasteners on the inner surface of the liner.

10. A brush cutter as claimed in claim 9 wherein the liner and the protective elements are made from high carbon steel.

11. A brush cutter as claimed in claim 8 wherein each protective element comprises a protective ring surrounding each hole and welded to the inner surface of the liner, the ring being at least as thick as that part of the corresponding one of the fasteners on the inner surface of the liner.

12. A brush cutter as claimed in claim 11 wherein the liner and the rings are made from high carbon steel.

13. A brush cutter as claimed in claim 8 wherein the liner and protective elements are made from high carbon steel.

14. A brush cutter as claimed in claim 8 wherein the liner and the protective elements are made from steel having a Brinnel hardness between 470 and 530.

* * * * *